US006805460B1

United States Patent
Zoller et al.

(10) Patent No.: US 6,805,460 B1
(45) Date of Patent: Oct. 19, 2004

(54) ADVANCED DOG COLLAR FLASHLIGHT

(75) Inventors: Deborah J. Zoller, 3865 Fredonia Dr., Los Angeles, CA (US) 90068; Kam Kaura, Laguna Hills, CA (US)

(73) Assignee: Deborah J. Zoller, Los Angeles, CA (US)

( * ) Notice: Subject to any disclaimer, the term of this patent is extended or adjusted under 35 U.S.C. 154(b) by 0 days.

(21) Appl. No.: 10/386,049

(22) Filed: Mar. 10, 2003

Related U.S. Application Data

(60) Provisional application No. 60/363,633, filed on Mar. 11, 2002, and provisional application No. 60/393,370, filed on Jul. 3, 2002.

(51) Int. Cl.[7] ............................................. F21V 21/00
(52) U.S. Cl. ...................................... 362/103; 362/191
(58) Field of Search ............................... 362/103, 108, 362/183, 190, 191, 196, 208, 276; 119/859

(56) References Cited

U.S. PATENT DOCUMENTS

| 743,578 A | * | 11/1903 | Shrodes ...................... 362/103 |
| 4,173,201 A | | 11/1979 | Chao et al. ................. 119/106 |
| 4,425,600 A | | 1/1984 | Barnhart ...................... 362/84 |
| 4,625,339 A | | 12/1986 | Peters ........................... 2/160 |
| 4,812,953 A | | 3/1989 | Ask et al. .................... 362/103 |
| 4,895,110 A | | 1/1990 | LoCascio ..................... 119/106 |
| 5,046,456 A | | 9/1991 | Heyman et al. ............. 119/106 |
| 5,193,896 A | * | 3/1993 | Oberlander ................. 362/103 |
| 5,345,368 A | | 9/1994 | Huff ............................ 362/103 |
| 5,370,082 A | | 12/1994 | Wade ........................... 119/859 |
| 5,535,106 A | | 7/1996 | Tangen ........................ 362/108 |
| D379,252 S | | 5/1997 | McIntosh ................... D30/152 |
| 5,630,382 A | | 5/1997 | Barbera et al. ............. 119/859 |
| 5,967,095 A | | 10/1999 | Greves ........................ 119/795 |
| 6,224,235 B1 | | 5/2001 | Parker ......................... 362/190 |
| 6,289,849 B1 | * | 9/2001 | Macedo et al. ............. 362/103 |

FOREIGN PATENT DOCUMENTS

EP WO 01/17342 A1 3/2001

* cited by examiner

Primary Examiner—Y My Quach Lee
(74) Attorney, Agent, or Firm—Cislo & Thomas LLP; Andrew S. Jordan, Esq.

(57) ABSTRACT

A dog collar flashlight for providing illuminating light sufficient to perceive and visually detect items on the ground and adjacent the animal to which the dog collar flashlight is attached. A dog collar flashlight has an illuminating light that goes far beyond the providing of mere visibility but allows the visual detection of objects illuminated by the light such as cracks in the sidewalk, obstacles in the path of the dog wearing the dog collar flashlight, and the activation of reflective material by the illuminating light. The light is controlled by a selectable switch and is housed along with the switch in a casing that allows a collar to engage in the dog collar flashlight. Collar-engaging loop portions attached to the dog collar flashlight case allows a collar to engage the dog collar flashlight and fix the dog collar flashlight to the dog or other animal.

17 Claims, 3 Drawing Sheets

ADVANCED DOG COLLAR FLASHLIGHT

CROSS-REFERENCES TO RELATED APPLICATIONS

This patent application is related to U.S. Provisional Patent Application Ser. No. 60/363,633 filed Mar. 11, 2002 for DOG COLLAR FLASHLIGHT and Ser. No. 60/393,370 filed Jul. 3, 2002 for ADVANCED DOG COLLAR FLASHLIGHT, which applications are incorporated herein by this reference thereto.

BACKGROUND OF THE INVENTION

1. Field of the Invention

This invention relates to domestic pet accessories, more particularly to a collar attachment or collar that provides an illuminating light source that goes beyond mere visibility but allows people and pets to see their way such as when walking a dog.

2. Description of the Related Art

Pet owners, particularly dog owners, take their animals for walks as recreation on generally a daily basis. Very often, such walks are taken beyond or before daylight hours. Today's busy and bustling society makes demands upon many persons who choose to keep pets such as dogs and the like such that they do not have the opportunity on a daily basis to walk their animal during daylight hours.

At night, visibility becomes an issue due to significant, if not heavy, automobile and other vehicle traffic in even rural areas. If a person or animal cannot be seen by a driver of such a vehicle, the risk of accident is particularly serious when crossing the street or otherwise. To remedy this vulnerability, lights and/or reflectors have been attached to collars, leashes, clothing, etc. in order to give the person or animal greater visibility to oncoming traffic. While such devices provide for greater safety, they generally do not provide sufficient illumination by which the animal or person can see their way. Such lights and/or reflectors are generally used to provide visibility of the wearer for oncoming traffic instead of visibility for the wearer of the device of the adjacent environment. Consequently, pets and owners are left to walk generally in the dark save only that light available from street lamps, the moon, etc.

While such light may generally be sufficient so that the animal and owner can see their way, certain obstacles or obstructions may generally go undetected until they are felt under foot or until such obstacles or obstructions trip up either the animal or the owner. The risk of stumbling and failing is consequently increased by the travel taken during non-daylight hours.

While there has been a demand for greater illumination for pedestrians and their animals, the art has not yet addressed this particular need beyond flashlights held in hand by the owner or person walking the dog. It is left to the present invention disclosed in more detail below to provide means by which illumination can be conveniently provided to both the animal and the pedestrian owner so that walks are no longer taken entirely in the dark and that the path taken by one's feet is better illuminated to prevent stumbling, tripping, and falling.

Several attempts have been made in the past that are relevant to the present technology as set forth in the table below.

| PATENT NUMBER | INVENTOR | DATE OF ISSUE |
| --- | --- | --- |
| 6,224,235 B1 | Parker | May 1, 2001 |
| 5,967,095 | Greves | Oct. 19, 1999 |
| 5,046,456 | Heyman et al. | Sep. 10, 1991 |
| 4,895,110 | LoCascio | Jan. 23, 1990 |
| 4,173,201 | Chao et al. | Nov. 6, 1979 |
| Des. 379,252 | McIntosh | May 13, 1997 |
| WO 01/17342 A1 | Macedo et al. | Mar. 15, 2001 |

The Parker '235 patent reference discloses a flashlight having clipping members that can be attached to an animal collar. The Greves '095 patent reference discloses an illuminated pet leash having a power source and operating switch. The Heyman et al. '456 patent reference discloses an illuminated pet collar for improving the nighttime visibility of the pet, wherein the collar has lights mounted therein.

The LoCascio '110 patent reference discloses an illuminated pet collar having a lighting source along the collar. The Chao et al. '201 patent reference discloses an illuminated animal collar having lighted elements, a power source and switching mechanism incorporated therein. The McIntosh '252 patent reference discloses a design for an illuminating dog collar. The Macedo et al. '342 foreign patent reference discloses a method for attaching a flashlight to a retractable dog leash.

None of these prior attempts succeeds in delivering convenient, economical, and readily-manufacturable dog collar lights.

SUMMARY OF THE INVENTION

In view of the foregoing disadvantages inherent in the known types of dog collar and animal lighting and/or illumination systems now present in the prior art, the present invention provides a new dog collar flashlight wherein the same can be used to provide illumination for a leashed animal and visibility for oncoming pedestrian and vehicular traffic.

The general purpose of the present invention, which will be described subsequently in greater detail, is to provide illumination means for leashed or collared animals, especially dogs which is not anticipated, rendered obvious, suggested, taught, or even implied by any of the prior art animal lighting systems, either alone or in any combination thereof.

In view of the foregoing disadvantages inherent in the known types of lights and other visibility devices now present in the prior art with respect to animals and pedestrians, the present invention provides a new dog collar flashlight that provides sufficient illumination so that people walking their dogs or other pedestrian-animal combinations can see where they are going and can see what is or is soon to be underneath their feet.

The general purpose of the present invention, which will be described subsequently in greater detail, is to provide illumination means by which greater visibility can be obtained over the important geography immediately adjacent and oncoming to a pet and/or owner's feet which is not anticipated, rendered obvious, suggested, or even implied by any other prior art illumination devices, either alone or any combination thereof.

The present invention provides a dog collar flashlight either as an attachment to a dog collar or integrated and incorporated into a dog collar.

The dog collar flashlight of the present invention is a buckle-like object incorporating a switchable light that shines sufficient light by which to see those items on the ground approximately two to four feet in front of the animal. Due to the angle of the light, the animal, and the owner, are able to see the oncoming path sufficiently soon in order to anticipate any obstacles or constructions, including cracks in the sidewalk, mud puddles, refuse, etc.

Additionally, should the animal stray from the path and seek to explore areas adjacent to the path, the owner can see where the dog is going so that he or she may retrieve the dog or have it "heel," so that the dog does not get into any dirt or refuse that might be unappealing to the owner.

In construction, a power source such as a disc or hearing aid battery is used to power a concentrated, or intense, light source, such as a white or bright LED (light-emitting diode). A switch is connected in line between the battery and the light to provide for switchably selectable operation of the light. A case may be constructed so that the light may only be turned on when the case is fully assembled. The case is also adapted so that the dog's collar will slip through a buckle-like loop construct that provides for an easy fit, easy engagement by the collar, and an appropriate angle for the shining of the illuminating light. The shining of the light may be enhanced by reflective material or otherwise. Generally, the light should be bright enough to illuminate the path before the animal wearing the dog collar flashlight, but not too bright so as to detract from the visual perception of other adjacent objects. Preferably, the light does not destroy night vision.

The dog collar flashlight of the present invention may be incorporated into a collar or a harness and may further enjoy an alternative embodiment in having the operational controls attached to a leash or the like for quick and easy manual operation by the pet handler. While the dog collar flashlight is described here as being applicable to dogs, it is generally applicable to any other domesticated animal for which the present light may be adapted.

A dog collar flashlight provides illuminating light sufficient to perceive and visually detect items on the ground and adjacent the animal to which the dog collar flashlight is attached. The dog collar flashlight has an illuminating light that goes far beyond the providing of mere visibility but allows the visual detection of objects illuminated by the light such as cracks in the sidewalk, obstacles in the path of the dog or other domesticated pet or animal wearing the dog collar flashlight, and the activation of reflective material by the illuminating light. The light is controlled by a selectable switch and is housed along with the switch in a casing that allows a collar to engage in the dog collar flashlight. Collar-engaging loop portions attached to the dog collar flashlight case allows a collar to engage the dog collar flashlight and fix the dog collar flashlight to the dog or other animal. Alternative embodiments include incorporation of the dog collar flashlight into the collar or into a harness and, in a further alternative embodiment, in a leash associated or attached to the collar. By providing the dog collar flashlight of the present invention, clumsy hand held flashlights are avoided while both the dog or pet owner and the animal itself are able to see better and with more clarity obstacles, obstructions, or items that are not as easily detected in the dark, such as at night when the dog may be walked by the owner.

OBJECTS OF THE INVENTION

It is an object of the present invention to provide a dog collar flashlight.

It is another object of the present invention to provide a flashlight that is attachable to a collar or other attachment attachable to a pet or other domesticated animal.

It is yet another object of the present invention to provide a source of illumination for dogs and their owners while walking in the dark.

It is yet another object of the present invention to provide a dog collar flashlight that illuminates the path in front of the animal.

It is yet another object of the present invention to provide an illuminating collar attachable to a dog or other domesticated animal or pet.

It is yet another object of the present invention to prevent trips, stumbles, and falls by a pet or an owner as well as providing early detection and perception of objects that might otherwise be occluded in the dark.

These and other objects and advantages of the present invention will be apparent from a review of the following specification and accompanying drawings. The foregoing objects are some of but a few of the goals attained by the present invention.

DESCRIPTION OF THE PREFERRED EMBODIMENT(S)

Figure 1:
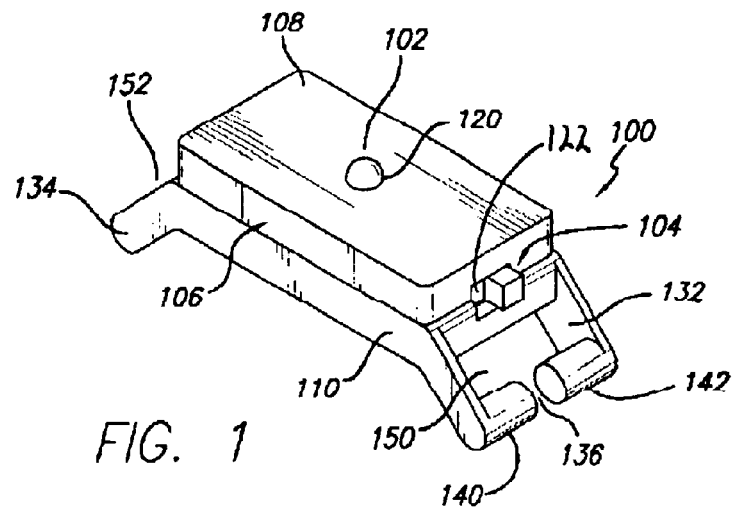
FIG. 1 is a front and side perspective view of the dog collar flashlight.

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Referring to the drawings where like numerals of reference designate like elements throughout it will be noted that the dog collar flashlight 100 of the present invention has an illuminating light 102 controlled by a switch 104. The light 102 and the switch 104 are housed in a case 106 having a front portion 108 and a rear portion 110.

Figure 2:
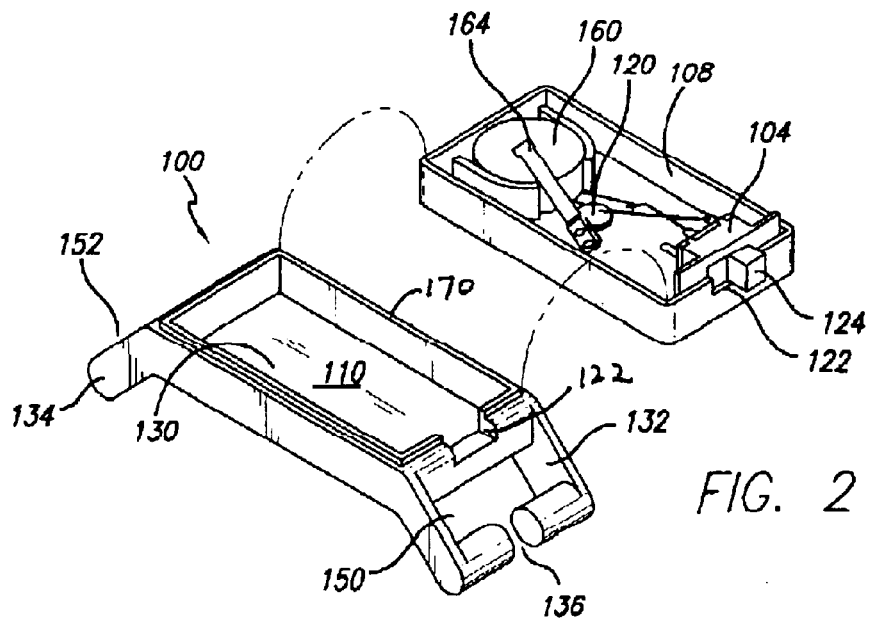
FIG. 2 is a front and side perspective view of the dog collar flashlight showing opposite halves and the internal structure thereof
Figure 3:
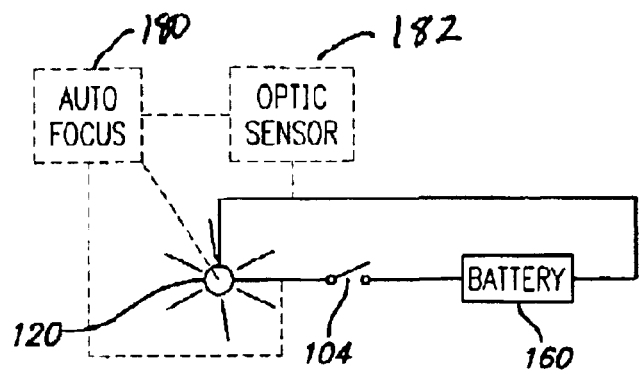
FIG. 3 is an electrical schematic of the circuitry used to provide the lighting function of the dog collar flashlight.
Figure 4:
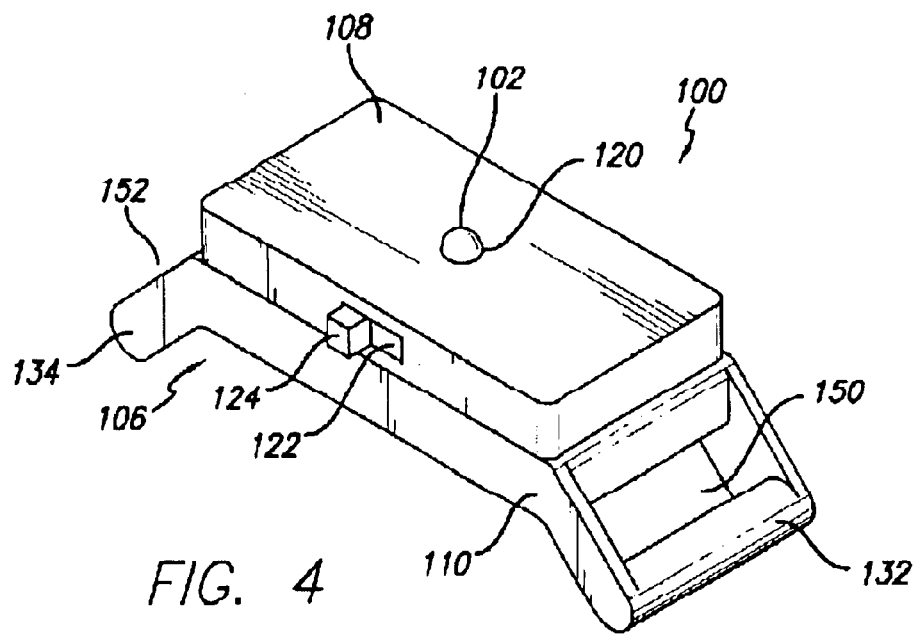
FIG. 4 is an alternative embodiment of the dog collar flashlight showing closed buckle or collar-engaging structures as opposed to the open structures showing in FIGS. 1 and 2 as well as a switch at the top as opposed to the side of the flashlight.

The front portion 108 has a central aperture 120 through which the light 102 protrudes and/or shines or illuminates. As shown in FIGS. 1, 2 and 4, the front case portion 108 may also have a switch slot 122 through which the knob 124 of the switch 104 may protrude. The protruding knob 124 allows easy manual access and control of the light 102 with generally one position of the knob 124 being the "on" position and generally an opposite position of the knob 124 being the "off" position.

The rear portion 110 of the case 106 generally has a flat foundation panel 130 attached to left and right collar-engaging loop structures 132, 134. As shown in FIGS. 1 and 2, a gap 136 in the collar-engaging loop structures enables dog collar flashlight 100 to be quickly attached to a collar, strap, or otherwise. The collar, for example, can have an edge passed through the gap 136 in order to enter the loop 132. Once the collar edge is introduced into the loop 132, the remainder of the collar may be fitted into the loop 132. Oppositely opposed extending extensions 140, 142 which define the gap 136 serve to hold the light 100 upon the collar. They prevent or restrain the collar's edges or other parts from passing back through the gap 136. This holds the light 100 on the collar until intentionally removed. Friction or direct attachment may serve to hold the light 100 on the collar. The light 100 may be free to slide along the collar. The gaps, or slots, 136 allow a larger size collar to fit into the collar-engaging loop-structures 132, 134 and generally provide secure engagement with such a collar despite the fact that there is an interruption in the collar-engaging structures 132, 134.

The foundation panel 130 may have two attachment screws (not shown) threadably passing therethrough to engage the front portion 108 of the case 106 and secure the front portion 108 to the rear portion 110. Other fasteners may be used.

The left and right collar-engaging loop portions 132, 134 generally define collar apertures 150, 152. The left and right collar apertures 150, 152 are generally semi-closed apertures through which a collar and the like may be passed in order to engage the dog collar flashlight 100 of the present invention. The collar apertures 150, 152 are structured such that the collar may provide sufficient friction to prevent needless sliding for the dog collar flashlight 100 along the collar. A snap-on or other strap (not shown) located across the rear portion 110 can provide additional friction to hold the dog collar flashlight 100 in place. The snap-on strap may be adjustable or otherwise fashioned to provide a snug or close fit between the snap-on strap and the collar. The collar apertures 150, 152 are generally not so small such that the dog collar flashlight 100 cannot be slid along the collar for easy adjustment. The dog collar flashlight 100 is preferably easily adjustable along the collar but once adjusted, generally does not easily stray from the selected position on the collar.

As shown in the Figures, the dog collar flashlight 100 of the present invention has a switch 104 with a knob 124 attached in series with a source of illumination or light 102 and a battery 160. The battery 160 may be a small hearing aid, camera, or other small battery that fits easily inside the case 106. A contact compression pad in the form of springy foam or the like may optionally ensure electrical contact between a battery lead 164 and the battery 160 when the front portion 108 is fully engaged and fastened upon the rear portion 110. Electrical connections such as those known in the art may be used to establish such connections between the switch 104, the light 102, and the battery 160. If screw- or bolt-engaging elements are used, they may threadably engage attachment screws in a manner that generally reduces wear upon the front case portion 108. Screw-engaging elements or fasteners may be designed to provide more resilience and durability than softer plastic that may be used for the case 106 as a whole. In order to provide a better-sealed environment, a gasket (not shown) can be used between the front portion 108 and the rear portion 110 in order to protect the confines of the case 106. As shown in FIG. 2, a lip 170 may extend away from the rear portion 110 then, when engaged by the front portion 108, serves to protect the confines of the case 106 from debris.

In alternative embodiments of the present invention, a dog collar flashlight 100 may be integrated into a collar or into a harness such that the collar-engaging loop structures 132, 134 may be omitted. Further integration may allow for elimination of the case 106 such that the collar or harness itself forms the case for the light 102, switch 104, and battery 160. In a further embodiment, a leash attached to the collar or harness may provide the switch 104 with wires or other leads leading down to the light 102. Battery placement for the leash embodiment may be as convenient with respect to the leash-collar construction.

Many sizes, configurations, and geometries for the dog collar flashlight 100 of the present invention may be achieved without departing from the scope of the present invention.

Alternatively, a dog collar flashlight/illuminating dog collar auto focus feature 180 can be incorporated into the dog collar flashlight 100 with some circuitry changes. The auto focus light feature can provide sufficient light with accuracy up to a certain distance under variable darkness conditions. The auto focus feature preferably uses a low amount of energy in order to determine where the light should be focused. An optic sensor 182 (which may detect any available light in the electromagnetic spectrum or portion thereof) may be incorporated into the unit to measure lighting conditions present in the environment and continuously monitor and provide lighting adjustment by varying the voltage to the light 102 which may be a super bright LED. The optic sensor may sample the amount of available light on an intermittent basis, possibly on millisecond intervals. This auto focus feature may also increase battery life by minimizing battery drain on the light 102 while providing optimal light conditions from the dog collar flashlight 100. The auto focus feature may also incorporate an auto shut off mechanism when going from dark to well lit areas. This further enhances battery life while optimizing the intensity and available illumination.

The light 102 used in the dog collar flashlight 100 may be optimized for a dog's eyes. Different animals have different spectra at which their eyes best respond and in the case of human beings, sodium lamps have been used to good effect for low energy purposes while providing satisfactory illumination as the transmitted light from a sodium lamp is very compatible with the light detectable by a human eye. Much in the same way as dog's hear audible frequencies beyond that of human beings, the spectral response for a dog's eye may differ from that of a human beings. Consequently, the super bright LED light 102 or other light used in the dog collar flashlight 100 may be "tuned" to the eye for which the light 102 is providing illumination.

The dog collar flashlight/illuminating dog collar 100 may incorporate a rechargeable battery source to eliminate battery replacements. Such rechargeable batteries may include but are not limited to nickel metal hydride, NiCad, lithium, etc., or any compatible recharging system. Additionally, the rechargeable battery may be powered by a small solar cell attached to the collar or otherwise that is exposed to daylight during the day. In this way, the dog's activities outside during the day will serve to recharge the rechargeable battery to provide illumination for the dog and/or owner at night.

The charging system can be associated with a number of power charging sources. Such sources may include photovoltaic cells mounted on the dog collar that can provide continuous charging under normal sunlight conditions. This will make the device completely automatic and requiring no handling for a long period of time. With incorporation of the above features (auto focus, auto shut off mechanism, rechargeable battery system, recharging system, and the like), the dog collar flashlight 100 becomes almost, if not entirely, completely automatic and maintenance free for a long period of time. This allows the owner to simply install the product on the collar and to practically forget about it as the dog collar flashlight 100 demands low maintenance and attendance by the owner.

Additionally, as shown in FIG. 4, the dog collar flashlight 100 of the present invention may have an integrated and closed loop collar-engaging structure having no slot or gap 136 at the ends of the left and right collar-engaging structures 132, 134 from the case 106. The switch 104 may also be placed at the top or bottom of the light 100.

Figure 5:
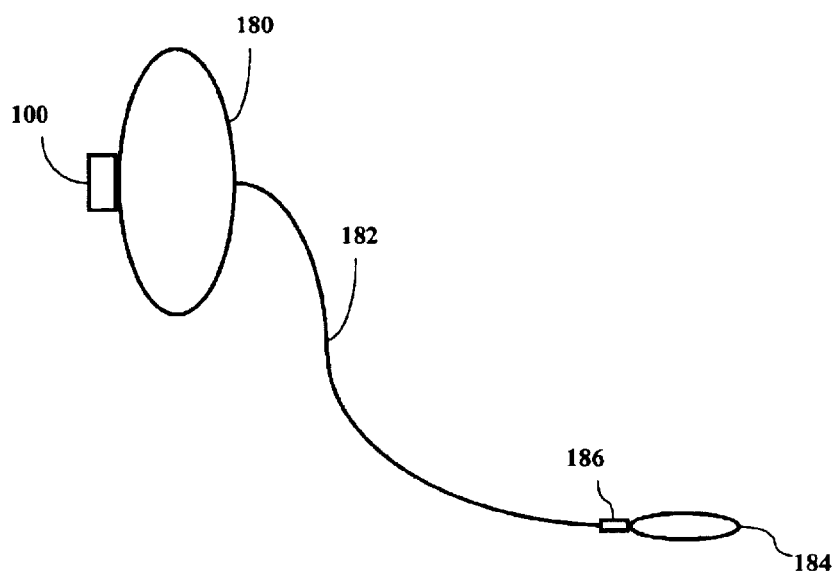
FIG. 5 is a schematic representation of a collar and leash incorporating the present invention with a switch near the handle of the leash.

An alternative embodiment is shown schematically in FIG. 5. The light 100 is attached to a collar 180 which in turn is attached to a leash 182 having a handle 184. A switch 186 is incorporated into the leash 182 and is shown near the handle 184. The switch 186 is coupled to the light 100 and operates in a manner similar to the switch 104 shown in the previous Figures to provide convenient means by which the light 100 can be operated.

While the present invention has been described with regards to particular embodiments, it is recognized that additional variations of the present invention may be devised without departing from the inventive concept.

What is claimed is:

1. A dog or pet collar flashlight, comprising:
   an illuminating light that provides light sufficient to illuminate objects from a distance of at least that present from a standing dog's collar to the ground;
   a switch coupled to and selectably operating said light;
   a case, said case housing said light and said switch, said case defining a central aperture through which said illuminating light protrudes and/or illuminates and said case defining a switch slot through which said switch protrudes;
   said case further comprises collar-engaging loop portions which define collar apertures through which a collar may be passed in order to engage the dog collar flashlight; and
   a battery coupled to said switch; whereby
   light may be selectably emitted by said illuminating light to sufficiently illuminate adjacent objects.

2. A dog or pet collar flashlight as set forth in claim 1 wherein said illuminating light functions to light a path for pet and pet owner.

3. A dog or pet collar flashlight as set forth in claim 1 wherein said switch is used to control said illuminating light.

4. A dog or pet collar flashlight set forth in claim 3 wherein said switch has a protruding knob and is attached in series to said illuminating light and said battery.

5. A dog or pet collar flashlight of claim 1 wherein each of said collar loop portions comprises oppositely opposed extending extensions defining a gap therebetween through which a collar can pass.

6. A dog or pet collar flashlight of claim 1 wherein each of said collar-engaging loop portions are continuous and completely enclose a collar aperture.

7. A dog or pet collar flashlight of claim 1 wherein said illuminating light is linked to an auto focus light feature which comprises an optic sensor that continuously samples and adjusts the brightness of said illuminating light.

8. A dog or pet collar flashlight of claim 7 wherein said auto focus light feature also comprises an auto shut off mechanism when going from dark to well-lit areas.

9. A dog or pet collar flashlight of claim 1 wherein said battery is rechargeable.

10. A dog or pet collar flashlight of claim 9 wherein said rechargeable battery is recharged and/or powered by a small solar cell which serves to recharge said battery during the day to provide for illumination at night.

11. A dog or pet collar flashlight, comprising:
    an illuminating light that provides light sufficient to illuminate objects from a distance of at least that present from a standing dog's collar to the ground, said illuminating light functioning to light a path for pet and pet owner;
    a switch coupled to and selectably operating said light, said switch controlling said illuminating light;
    said switch having a protruding knob and said switch being attached in series to said illuminating light;
    a case, said case housing said light and said switch, said case defining a central aperture through which said illuminating light protrudes and/or illuminates, said case defining a switch slot through which said switch protrudes;
    said case having collar-engaging loop portions which define collar apertures through which a collar may be passed in order to engage the dog collar flashlight; and
    a battery coupled in series to said switch and said illuminating light; whereby
    light may be selectably emitted by said illuminating light to sufficiently illuminate adjacent objects.

12. A dog or pet collar flashlight as set forth in claim 11, further comprising:
    each of said collar-engaging loop portions comprises oppositely opposed extending extensions defining a gap therebetween through which a collar can pass.

13. A dog or pet collar flashlight as set forth in claim 11, further comprising:
    each of said collar-engaging loop portions being continuous and completely enclosing a collar aperture.

14. A dog or pet collar flashlight as set forth in claim 11, further comprising:
    said illuminating light coupled to an auto focus light feature having an optic sensor that continuously samples ambient light levels and adjusts the brightness of said illuminating light.

15. A dog or pet collar flashlight as set forth in claim 11, further comprising:
    an auto shut off mechanism coupled to said illuminating light, said auto shut off mechanism extinguishing or diminishing said illuminating light when going from dark to well-lit areas.

16. A dog or pet collar flashlight as set forth in claim 11, further comprising:
    said battery being rechargeable.

17. A dog or pet collar flashlight as set forth in claim 16, further comprising:
    a solar cell coupled to said rechargeable battery, said rechargeable battery recharged and/or powered by said solar cell, said solar cell serving to recharge said battery during the day to provide illumination at night.

* * * * *